United States Patent [19]

Blomley

[11] Patent Number: 4,748,664

[45] Date of Patent: May 31, 1988

[54] TELEPHONE POWER SUPPLY

[75] Inventor: Peter F. Blomley, Bishop's Stortford, Great Britain

[73] Assignee: STC Plc, London, England

[21] Appl. No.: 930,391

[22] Filed: Nov. 14, 1986

[30] Foreign Application Priority Data

Nov. 28, 1985 [GB] United Kingdom ............... 8529348

[51] Int. Cl.$^4$ ............................................. H04M 1/60
[52] U.S. Cl. .................................. 379/395; 379/387
[58] Field of Search ............... 379/395, 394, 398, 391, 379/392, 387, 388

[56] References Cited

U.S. PATENT DOCUMENTS 4,233,474 11/1980 Hishinuma et al. ................ 379/395
4,680,789 7/1987 Sijbers et al. ...................... 379/395

FOREIGN PATENT DOCUMENTS 1031882 5/1978 Canada ............................... 379/395
2126052 3/1984 United Kingdom ............... 379/395

Primary Examiner—Jin F. Ng
Assistant Examiner—R. Vaas
Attorney, Agent, or Firm—Lee, Smith & Zickert

[57] ABSTRACT

To provide an adequate dc supply to the electronics of a telephone, when on hook or off hook, there is a transistor (T2) with its emitter-collector path in one line wire, and a storage capacitor (Cpsu) across the input to the telephones's circuits. This capacitor is charged up and maintains dc supply when the line voltage (at A) falls below a preset level. The base of this transistor is connected via another transistor (T1) to the other line wire. The speech output ($V_{IN}$) is connected via an operational amplifier (A) to the base of the second transistor (T2). Hence the dc supply and the speech output are in parallel.

3 Claims, 2 Drawing Sheets

TELEPHONE POWER SUPPLY

BACKGROUND OF THE INVENTION

The present invention relates to electronic circuits for use at a telephone subscriber's instrument, especially where it is necessary to provide a "features" telephone for telephone administrations that require a low voltage drop telephone. Many telephone administrations require the telephone subset to have a very low voltage drop across the line terminals when off hook (e.g. U.S. requirement of 6 volts at 20 mA)—to guarantee line "capture" at the telephone exchange. While it is possible to design a low voltage plain ordinary telephone (POT) the market requirement for more features telephones (which need more power) has been met either by offending the regulations, by using batteries/mains powering, or by using large inductors (e.g. 12 Henries, 100 mA rated).

Many POTs can provide 1 or 2 mA to external circuits such as signalling integrated circuits (ICs). However, the features telephone requires 2 or 3 mA for its microprocessor (if fitted) and as much power as possible (say 12–15 mA @ 3.5 volt minimum) for Call Progress Monitor (CPM) or Full Speech Monitor (FSM) or Handsfree (HF) operation to achieve satisfactory audio power output. Existing POT telephone ICs cannot meet these current demands.

FIG. 1 shows the configuration of the output stage of one such IC. In this, $V_L$ is the line voltage, $I_L$ is the line current, and $I_C$ is the current supplied to the telephone's electronic circuitry. Hence all the power for the internal circuits is drawn off from the line via the $Z_C$ network. This design restriction is caused by the modulation on the telephone line driving the instantaneous line voltage $V_L$ below the positive terminal of the power supply (which has to be derived from the line—as there is no other source of power). Also during transmission, power is wasted driving transmitter output current into the passive $Z_C$ network. In FIG. 1, $V_L = V_{REF} + (I_C Z_C)$ where $Z_C$ is typically in the range of 600 to 1000 ohms, which limits $I_C$ to 1–2 mA maximum. $R_{EXT}$ is used to sense $I_L$, for gain regulation, for example, and if $I_C$ is large then an error develops.

In the markets that allow it, it is possible to design a series-connected transmitter and loudspeaker power amplifier. The difficulty is voltage drop and even with the use of expensive VMOS polarity bridges in place of silicon diodes it is still not possible to meet many of the specifications on voltage drop.

Another difficulty with these features telephones is due to "on-hook" operation. Here the telephone is mechanically "on hook" but electrically "off hook" since the handset is in its cradle but the electronics fully or partially powered. Examples of this are the CPM/FSM and HF facilities referred to above. Traditionally this uses a complex mechanical interlocking switch, which although not very expensive is difficult to design and needs modifications for each telephone style. This design problem is eliminated with an electronic hookswitch but this has hitherto been rather expensive on components.

OBJECT AND SUMMARY OF THE INVENTION

An object of the invention is to provide an output circuit for a telephone instrument circuit which enables the above difficulties to be minimised or overcome.

According to the present invention, there is provided an electronic circuit for the supply of direct current power to the electronic circuits in a telephone subscriber's instrument, which includes a first transistor whose emitter-collector path is in one leg of the line, capacitor connected across the inputs of the telephone circuit, which capacitor is charged by current passing through the emitter-collector path of the transistor when the circuit is connected to a said telephone line, the charge on the capacitor serving to maintain the voltage across the line wires, a connection from the base of said transistor via the collector-emitter path of a second transistor to the other wire of the line, and a connection from the instrument's speech output to the base of the second transistor.

In this solution the transmitter efficiency is improved over that of the known circuit shown in FIG. 1, and power is extracted in parallel with the transmit output stage. Since high voltage devices may be used for the output stage and power extraction, the circuit is also suitable for loop disconnect signalling/timed loop break recall and hookswitch.

DETAILED DESCRIPTION OF PREFERRED EMBODIMENTS OF THE INVENTION

Figure 2:
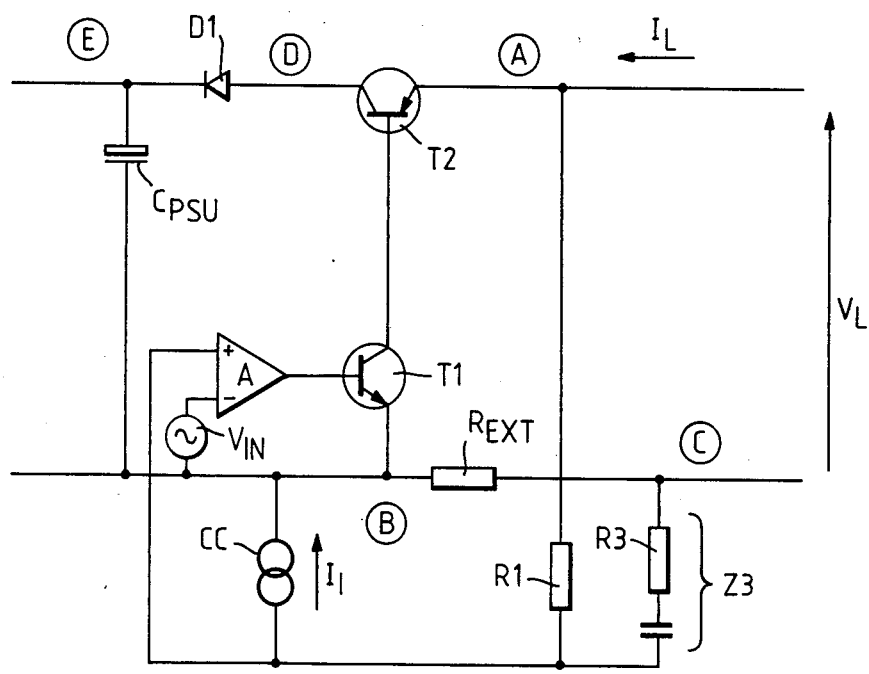

FIG. 2 shows a simple embodiment of the invention. It can be shown that the dc characteristic of the circuit is given by:

$$V_L = I_1 R_1 + (I_L \times R_{EXT})$$

and the impedance is $$Z = R_{EXT} \times \frac{(R_1 + Z_3)}{Z_3}$$

shunted by $(R_1 + R_3)$—which may be considerably greater than Z.

The line current $I_L$ is passed through T2. If node (A) is more positive than node (D) which in turn is more positive than node (E), then conduction from (A) to (E) is possible and the line current charges Cpsu. If however, the voltage at (A) has to be lower than the voltage at (E) by the constraints of the feedback loop, then the line current flows through the base of T2 down to the collector of T1. Hence the current supply to the associated circuits comes from the collector current of T2, and is maintained during periods when the voltage of A is lower than that at E by the charge on the capacitor.

Figure 1:
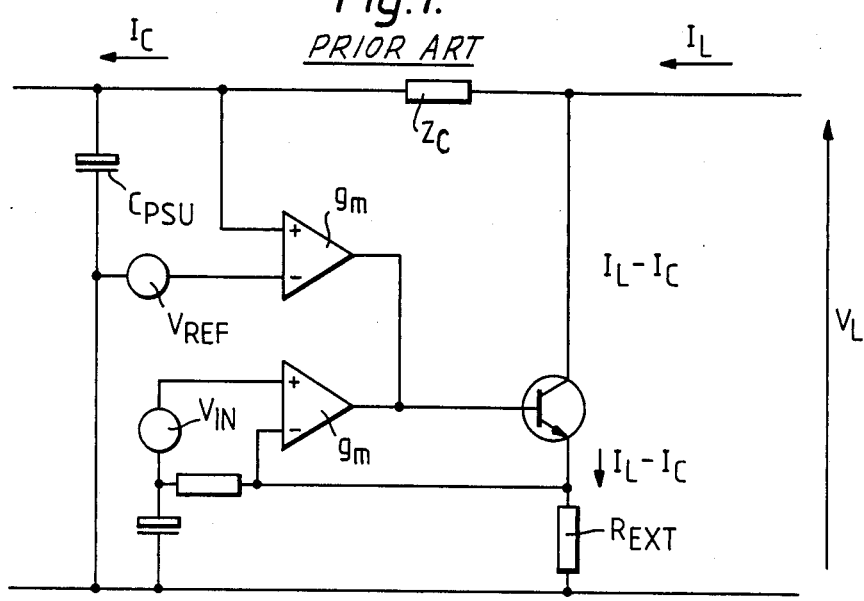
FIG. 1, already described, shows a known arrangement for the output connection, i.e. the connection to line, for a telephone subscriber's instrument, while FIGS. 2, 3 and 4 each relates to a circuit embodying the invention. Each of FIGS. 2, 3 and 4 shows as much of the output connection arrangement for a telephone subscriber's instrument as is needed to understand the invention.

The speech output of the set, shown as $V_{IN}$, is applied to one input of an operational amplifier A, the output of which goes to the base of T1, so that the dc supply and the speech output are in parallel. The other input of the amplifier A is connected to one line wire via a constant current device CC, which could, for instance, be a suitably biased transistor. The other components of the circuit, i.e. $R_1$, $Z_3$, are referred to above. Although this circuit is an improvement over FIG. 1 it has disadvantages:

(1) There is a very large gain change as T2 goes from conduction of line current through the collector to saturation with line current through the base. This gives a problem with the conflicting requirements of adequate loop gain to give good high frequency response and of maintaining loop stability.

(2) The peak ac signal swing on the line is limited by the collector saturation of T1 and the (high current) base-emitter drop of T2—which may overrun T2 anyway.

(3) The diode D1 causes a reduction in the available voltage at (E) due to its junction. This could be minimised by the use of a Schottky diode for D1.

Figure 3:
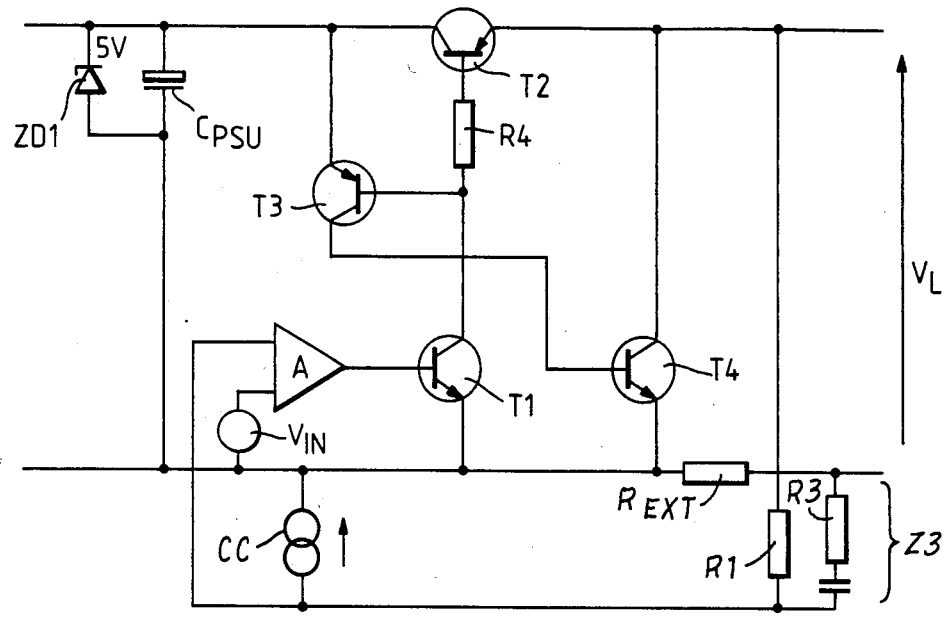

FIG. 3 shows a low voltage variant of FIG. 2 which overcomes the above disadvantages. As T2 drops into saturation, the emitter base junction of T3 mirrors the collector base of T2, and T4 supplies the drive to the line, amplifying the collector current of T3. Thus the gain change problem caused by variations in direct voltage reaching the electronics is minimised, the peak ac swing is increased and the loss due to D1 (in FIG. 2) is eliminated. Diode ZD1 is added to prevent emitter base avalanche on T2 and prevent damage to low voltage circuits connected across Cpsu. It could be replaced by a shunt regulator circuit on board the integrated circuit.

Figure 4:
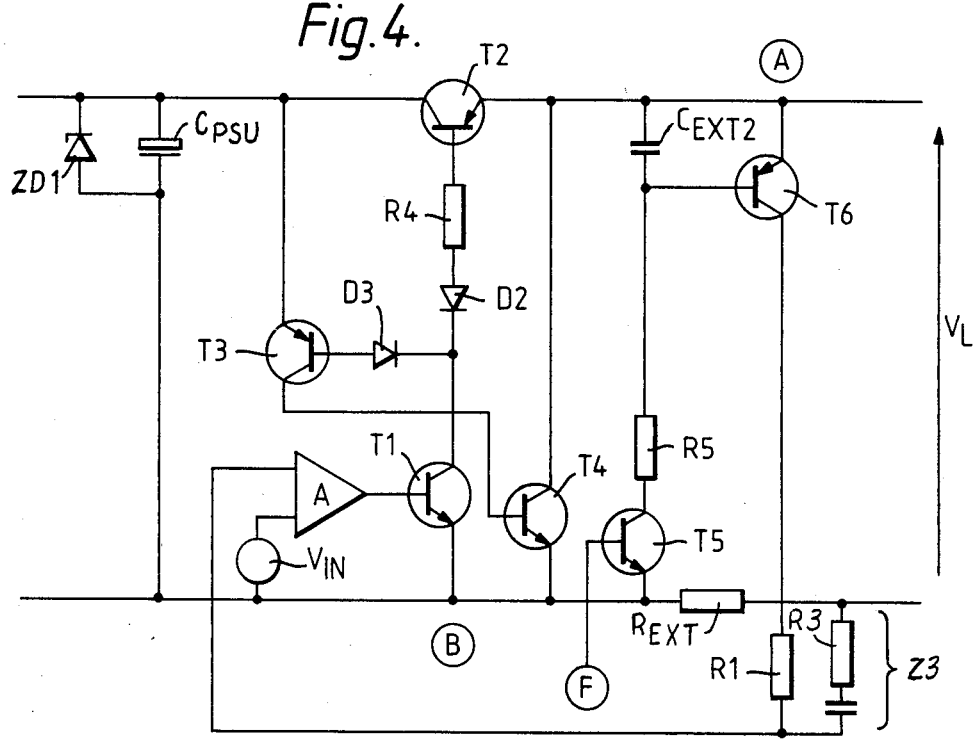

A high voltage variant is shown in FIG. 4, which is similar in many respects to the circuit of FIG. 3. During normal off hook operation node (F) is energised with a constant current, forcing T5 and T6 into saturation, thus connecting resistor R1 to node (A). Capacitor $C_{EXT2}$ holds T6 in conduction when a large signal appears on node (A) and the potential difference between (A) and (B) is small.

During on hook conditions node (F) is de-energised by connections (not shown) from the hookswitch or its electronic equivalent, and the amplifier A is turned off. This turns off the current through T4 and T2. Since the line voltage off hook is usually 50 volt dc plus any superimposed ringing voltage, this appears at the base of T2: diode D3 therefore protects the emitter-base path of T3 and D2 matches the characteristic of D3. With node (F) de-energised the possibility of a sneak conduction path through $R_1$ to the amplifier is eliminated. For those markets insensitive to this leakage, or where loop disconnect dialling without an electronic hookswitch is required, it is possible to eliminate T5 and T6 and reconnect $R_1$ directly to node A.

Whilst on hook a small amount of current is needed to enable amplifier A to be re-energised when going off hook: this may be provided by a high value resistor from node A or by an internal battery.

Loop disconnect signalling is performed by overriding/de-energising the amplifier A and by pulsing the base of T1.

The transistors T1 to T6 and the diodes D2 and D3 may be either discrete or integrated in a suitable high voltage process.

The arrangements described with reference to FIGS. 2, 3 and 4 can also function as the electronic equivalent of the hookswitch, so that the necessity for a mechanical hookswitch for use when on-hook, e.g. when using the telephone as a handsfree set, is avoided. To do this, the various components connected across the line, such as the transistors and associated circuit elements are high voltage devices. Thus when the subscriber "offhooks" the change of voltage produced is more than adequate for it to be seen at the exchange as an offhooking. The main bulk of the circuit is within the integrated circuit, which only "sees" low voltages, but it also controls these external high voltage devices.

The combination of power extraction to drive the various elements of the integrated circuit, e.g. amplifier A, in the telephone set, with the transmission of speech is so effected that the speech signal on the line is not affected by the fluctuations in demand for these various elements. This is due to the design of the circuit whereby its control loop always seeks to ensure that the correct conditions exist on the line. Further, wherever possible, all excess power is diverted into the storage capacitor Cpsu.

I claim:

1. An electronic circuit for the supply of direct current power to the electronic circuits in a telephone subscriber's instrument, which electronic circuit includes:

a first transistor whose emitter-collector path is in one wire of a two-wire telephone line to which the instrument is connected;

a capacitor connected across the inputs of the telephone circuits which include said electronic circuits, said capacitor being charged by a current passing through the emitter-collector path of said transistor when the electronic supply circuit is connected to said telephone line, the charge on the capacitor serving to maintain the voltage across the wires of the telephone line;

a connection from the base of said transistor via the collector-emitter path of a second transistor to the other wire of the telephone line; a connection from the speech output of the instrument to the base of said second transistor; and a diode such as a Schottky diode via which the collector-emitter path of the first transistor is connected to said capacitor, said diode being so poled as to isolate the capacitor from the line when the line voltage falls below the voltage to which said capacitor is charged.

2. An electronic circuit for the supply of direct current power to the electronic circuits in a telephone subscriber's instrument, which electronic circuit includes;

a first transistor whose emitter-collector path is in one wire of a two-wire telephone line to which the instrument is connected;

a capacitor connected across the inputs of the telephone circuits which include said electronic circuits, said capacitor being charged by a current passing through the emitter-collector path of said transistor when the electronic supply circuit is connected to said telephone line, the charge on the capacitor serving to maintain the voltage across the wires of the telephone line;

a connection from the base of said transistor via the collector emitter path of a second transistor to the other wire of the telephone line; a connection from the speech output of instrument to the base of said second transistor;

a resistive impedance included in the connection between the base of said first transistor and said second transistor;

a third transistor whose base is connected to the junction between said resistive impedance and said second transistor and whose emitter is connected to the junction between said first transistor and said capacitor; and a fourth transistor whose emitter-collector path is connected between the wires of the telephone line on the line side of said second transistor and whose base is connected to the collector of said third transistor.

3. An electronic circuit as claimed in claim 2, and which includes:

an operational amplifier having an input to which is applied a connection which conveys speech outgoing from said telephone instrument to said telephone line, said operational amplifier having an output which is connected to the base of said second transistor;

a fifth transistor whose base is connected to a constant current source, said connection to the constant current source being disabled when the telephone instrument is in its on-hook condition;

a connection from the emitter of the fifth transistor to the other wire of said telephone line wires;

a connection from the collector of said fifth transistor via a further resistive impedance and a further capacitor to the one wire of said telephone line, said one wire being the wire in which said first transistor is connected; and a sixth transistor whose base-emitter path is connected across said further capacitor and whose collector is coupled via a third resistive impedance to another input of the operational amplifier.

* * * * *